United States Patent
Kondo et al.

(10) Patent No.: US 8,128,339 B2
(45) Date of Patent: Mar. 6, 2012

(54) BEARING SUPPORT STRUCTURE AND GAS TURBINE

(75) Inventors: Mitsuru Kondo, Hyogo (JP); Hiroji Tada, Hyogo (JP); Osamu Morii, Aichi (JP); Tadayuki Hanada, Aichi (JP); Hirokazu Hagiwara, Aichi (JP); Kunihiro Shimizu, Aichi (JP); Tomohiro Imae, Hyogo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 517 days.

(21) Appl. No.: 12/373,120

(22) PCT Filed: Jul. 11, 2007

(86) PCT No.: PCT/JP2007/063811
§ 371 (c)(1),
(2), (4) Date: Apr. 2, 2009

(87) PCT Pub. No.: WO2008/007697
PCT Pub. Date: Jan. 17, 2008

(65) Prior Publication Data
US 2009/0246018 A1 Oct. 1, 2009

(30) Foreign Application Priority Data
Jul. 12, 2006 (JP) .................................. 2006-191729

(51) Int. Cl.
*F16C 27/02* (2006.01)
(52) U.S. Cl. ......... 415/9; 415/119; 415/174.4; 415/229; 384/99; 384/535; 384/581; 416/2; 416/174
(58) Field of Classification Search .............. 415/9, 119, 415/174.4, 229; 384/99, 535, 536, 581, 582; 416/2, 174
See application file for complete search history.

(56) References Cited

U.S. PATENT DOCUMENTS

| | | | | | |
|---|---|---|---|---|---|
| 3,552,338 A | * | 1/1971 | Graham | ........................ | 112/270 |
| 4,109,418 A | * | 8/1978 | Ebelt | ............................... | 451/27 |
| 4,298,235 A | | 11/1981 | Squirrell | | |
| 4,775,291 A | * | 10/1988 | Culbertson et al. | ........... | 415/104 |
| 6,966,154 B1 | * | 11/2005 | Bierwirth | ..................... | 52/167.4 |

FOREIGN PATENT DOCUMENTS

| | | |
|---|---|---|
| JP | 47-20613 Y1 | 7/1972 |
| JP | 61-82124 U | 5/1986 |
| JP | 63-109027 U | 7/1988 |
| JP | 8-28557 A | 2/1996 |
| JP | 9-269005 A | 10/1997 |
| JP | 9-324699 A | 12/1997 |
| JP | 2004-052598 A | 2/2004 |
| JP | 2004-346885 A | 12/2004 |

OTHER PUBLICATIONS

International Search Report of PCT/JP2007/063811, Mailing Date of Oct. 16, 2007.

* cited by examiner

*Primary Examiner* — Gary F. Paumen
(74) *Attorney, Agent, or Firm* — Westerman, Hattori, Daniels & Adrian, LLP

(57) ABSTRACT

To provide a bearing support structure and a gas turbine that prevent damage of device induced by a rotor shaft when the rotor shaft is unbalanced, the bearing support structure and the gas turbine includes: a casing (7) formed in a cylindrical shape; a bearing unit (8) formed in a cylindrical shape and housed in the casing (7); a rotation shaft (5) rotatably supported by the bearing unit (8); and a reaction-force decreasing unit (13) that connects the casing and the bearing unit, and is configured to decrease a radial reaction force on the bearing unit side.

8 Claims, 6 Drawing Sheets

BEARING SUPPORT STRUCTURE AND GAS TURBINE

TECHNICAL FIELD

The present invention relates to a bearing support structure that supports a bearing on a casing, and a gas turbine in which fuel is supplied to compressed air to cause combustion, and generated combustion gas is supplied to the turbine to obtain rotative power.

BACKGROUND ART

Conventionally, as the gas turbine, there is one applied to, for example, a turbo shaft engine of a helicopter. Such a gas turbine includes a compressor, a combustor, and a turbine, where air taken from an air intake is compressed by the compressor to become high-temperature and high-pressure compressed air, the fuel is supplied to the compressed air by the combustor to cause combustion, so that the high-temperature and high-pressure combustion gas drives the turbine, and the rotative power is output to a transmission of the helicopter via a rotation shaft as an output shaft connected to the turbine. In this case, the turbine is constructed such that a plurality of stationary blades and moving blades is alternately arranged in a turbine cylinder, where the rotation shaft is rotated by driving the moving blades by the combustion gas. The combustion gas, which has driven the turbine, is converted to have a static pressure by a diffuser in an exhaust cylinder and then discharged to the air.

In this gas turbine, as a structure for supporting a bearing unit that rotatably supports the rotation shaft on the casing, the casing and the bearing unit are generally connected with each other by rigid connection via a support member.

For example, a frame structure of the gas turbine described in Patent Document 1 includes an outer periphery that connects radial inner ends of the support member with each other to form an inner wall of a combusted exhaust gas passageway, an inner corn portion for supporting a bearing, and front and rear inner walls for connecting the front and the rear of the outer periphery with the inner corn portion, respectively. The front and rear inner walls are constructed such that one of the front and rear inner walls has a low rigidity with respect to radial deformation, and the other has a sufficient rigidity (for example, see Patent Document 1).

Patent Document 1: Japanese Patent Application Laid-open No. H9-324699

DISCLOSURE OF INVENTION

Problem to be Solved by the Invention

In the frame structure of the gas turbine described in Patent Document 1, because one of the front and rear inner walls has a low rigidity with respect to radial deformation and the other has a sufficient rigidity, the one side having a low rigidity deforms radially, to thereby reduce thermal stress. However, for example, when the rotation shaft abnormally rotates to cause a fracture of the moving blade and therefore the rotation shaft becomes unbalanced, the rotation shaft largely vibrates, and the vibration is transmitted to the bearing unit and the casing. When the casing itself vibrates, a structure such as the bearing and the casing can be damaged or broken.

It is therefore an object of the present invention to provide a bearing support structure and a gas turbine that can suppress a damage of the device due to the rotation shaft by effectively reducing vibrations of the rotation shaft.

Means for Solving Problem

According to an aspect of the present invention, a bearing support structure comprises: a casing formed in a cylindrical shape; a bearing unit formed in a cylindrical shape and housed in the casing; a rotation shaft rotatably supported by the bearing unit; and a reaction-force decreasing unit that connects the casing and the bearing unit, and is configured to decrease a radial reaction force on the bearing unit side.

In the bearing support structure, the reaction-force decreasing unit may be formed in an annular shape around the bearing unit, and may have a higher rigidity or strength in a circumferential direction than in a radial direction.

In the bearing support structure, the reaction-force decreasing unit may have a plurality of diaphragms formed in a disk-like shape perpendicular to a rotation axis of the rotation shaft.

In the bearing support structure, the reaction-force decreasing unit may include a connecting unit that is formed in the cylindrical shape having a central axis parallel with the rotation axis, and that connects one ends of adjacent ones of the diaphragms with each other.

In the bearing support structure, the reaction-force decreasing unit may include: a first diaphragm having a proximal end fixed to the casing; a second diaphragm having a proximal end fixed to the bearing unit and an outer diameter longer than an inner diameter of the first diaphragm; and a third diaphragm positioned between the first diaphragm and the second diaphragm, with one end thereof being connected to a distal end of the first diaphragm via a first connecting unit and the other end being connected to a distal end of the second diaphragm via a second connecting unit.

In the bearing support structure, the reaction-force decreasing unit may have a bellows structure.

In the bearing support structure, the reaction-force decreasing unit may have a beam portion that is formed in a cylindrical shape having a central axis parallel with the rotation axis, and that is formed with a plurality of slits in a direction of the rotation axis.

According to another aspect of the present invention, a gas turbine in which fuel is supplied by a combustor to compressed air that is compressed by a compressor to cause combustion, and generated combustion gas is supplied to the turbine to obtain rotative power, comprises: an outer diffuser formed in a cylindrical shape; an inner diffuser formed in a cylindrical shape and provided inside of the outer diffuser; a bearing unit formed in a cylindrical shape and housed in the inner diffuser; a turbine rotor having a moving blade positioned on a downstream side of a stationary blade in a flow direction of the combustion gas, and rotatably supported by the bearing unit; an exhaust gas passageway formed between the outer diffuser and the inner diffuser, and capable of exhausting the combustion gas having passed through the moving blade as an exhaust gas; and a reaction-force decreasing unit that connects the inner diffuser and the bearing unit, and decreases a radial reaction force on the bearing unit side.

EFFECT OF THE INVENTION

The bearing support structure of the invention includes the casing formed in a cylindrical shape, the bearing unit formed in a cylindrical shape and housed in the casing, the rotation shaft rotatably supported by the bearing unit, and the reaction-force decreasing unit that connects the casing and the bearing unit, and can decrease the radial reaction force on the bearing unit side.

Therefore, the casing houses the bearing unit, the bearing unit rotatably supports the rotation shaft in the casing, and the bearing unit and the casing are connected by the reaction-force decreasing unit. Accordingly, even if the rotation shaft becomes unbalanced to cause large vibration on the rotation shaft, the radial reaction force on the bearing unit side is decreased by the reaction-force decreasing unit, thereby enabling to suppress a damage of the device due to the vibration of the rotation shaft.

According to the bearing support structure of the invention, the reaction-force decreasing unit is formed in the annular shape around the bearing unit, and has a high rigidity or strength in a circumferential direction than in the radial direction. Therefore, a high torsional rigidity or strength can be ensured with respect to the circumferential direction in a connecting portion between the casing and the bearing unit, by the reaction-force decreasing unit formed in the annular shape around the bearing unit and having the high the rigidity or strength in the circumferential direction than in the radial direction. Accordingly, even if the bearing unit is stuck, the reaction-force decreasing unit can resist the torsional force via the bearing unit.

According to the bearing support structure of the invention, the reaction-force decreasing unit has the plural diaphragms formed in the disk-like shape perpendicular to the rotation axis of the rotation shaft. Therefore, because the diaphragms formed in the disk-like shape perpendicular to the rotation axis of the rotation shaft are curved out of plane and deformed, the radial reaction force in the casing and the bearing unit can be decreased.

According to the bearing support structure of the invention, the reaction-force decreasing unit has the connecting unit that is formed in the cylindrical shape having the central axis parallel with the rotation axis and that connects one ends of the adjacent diaphragms with each other. Therefore, because the adjacent diaphragms are connected by the connecting unit with each other in parallel with a gap there between, the rigidity with respect to the radial direction of the entire reaction-force decreasing unit is not increased, thereby enabling to effectively decrease the radial reaction force on the bearing unit side.

According to the bearing support structure of the invention, the reaction-force decreasing unit includes the first diaphragm having the proximal end fixed to the casing, the second diaphragm having the proximal end fixed to the bearing unit and the outer diameter longer than the inner diameter of the first diaphragm, and the third diaphragm positioned between the first diaphragm and the second diaphragm, with one end thereof being connected to the distal end of the first diaphragm via the first connecting unit and the other end being connected to the distal end of the second diaphragm via the second connecting unit. Therefore, the bearing unit and the casing are connected with each other via the first, second, and third diaphragms. Because the outer diameter of the second diaphragm is longer than the inner diameter of the first diaphragm, the first, second, and third diaphragms are provided in layers in the axial direction. Further, because the distal end of the first diaphragm is connected to one end of the third diaphragm by the first connecting unit, and the distal end of the second diaphragm is connected to one end of the third diaphragm by the second connecting unit, a flexible part can be increased in the entire reaction-force decreasing unit. Accordingly, the rigidity of the reaction-force decreasing unit can be reduced, and a spring constant can be decreased, thereby enabling to sufficiently decrease the radial reaction force on the bearing unit side, even if the length of the connecting unit in the axial direction is decreased. Because the length of the connecting unit in the axial direction can be decreased, the bearing support structure can be applied even when an axial space is narrow at a position where the reaction-force decreasing unit is installed. Furthermore, because the first, second, and third diaphragms are arranged so that parts thereof are overlapped on each other in the axial direction, the length of the reaction-force decreasing unit in the radial direction can be decreased as well. Accordingly, the bearing support structure can be applied even when the axial space is narrow at the position where the reaction-force decreasing unit is installed.

According to the bearing support structure of the invention, the reaction-force decreasing unit has a bellows structure. Therefore, because many diaphragms formed in the disk-like shape perpendicular to the rotation axis are curved out of plane and deformed, the radial reaction force on the bearing unit side can be decreased, and an axial reaction force can be also decreased effectively due to expansion and contraction of the reaction-force decreasing unit in the axial direction.

According to the bearing support structure of the invention, the reaction-force decreasing unit has a beam portion that is formed in a cylindrical shape having the central axis parallel with the rotation axis and that is formed with the plural slits in the direction of the rotation axis. Therefore, the rigidity of the beam portion that is formed in the cylindrical shape having the central axis parallel with the rotation axis is reduced by the slits formed in the direction of the rotation axis, to thereby obtain a flexible structure in the radial direction. Accordingly, the radial reaction force on the bearing unit side can be decreased by the reaction-force decreasing unit.

The gas turbine of the invention in which fuel is supplied by the combustor to compressed air that is compressed by the compressor to cause combustion, and the generated combustion gas is supplied to the turbine to obtain rotative power includes the outer diffuser formed in a cylindrical shape, the inner diffuser formed in a cylindrical shape and provided inside of the outer diffuser, the bearing unit formed in a cylindrical shape and housed in the inner diffuser, the turbine rotor having the moving blade positioned on the downstream side of the stationary blade in a flow direction of the combustion gas, and rotatably supported by the bearing unit, the exhaust gas passageway formed between the outer diffuser and the inner diffuser and capable of exhausting the combustion gas having passed through the moving blade as the exhaust gas, and the reaction-force decreasing unit that connects the inner diffuser and the bearing unit and can decrease the radial reaction force on the bearing unit side.

Therefore, the fuel is supplied by the combustor to the compressed air that is compressed by the compressor to cause combustion, the generated combustion gas is supplied to the turbine, and the combustion gas having passed through the stationary blade collides with the moving blade to rotate a turbine rotor provided with the moving blade, to thereby obtain the rotative power. The combustion gas having passed through the moving blade is exhausted to the outside as the exhaust gas through the exhaust gas passageway formed by the outer diffuser and the inner diffuser. Meanwhile, the bearing unit rotatably supporting the turbine rotor is connected to the inside of the inner diffuser via the reaction-force decreasing unit. Therefore, even if the turbine rotor becomes unbalanced to cause large vibration in the turbine rotor, the radial reaction force on the bearing unit side is decreased by the reaction-force decreasing unit, thereby enabling to suppress a damage of the device due to the vibration of the turbine rotor as the rotation shaft.

Figure 1:
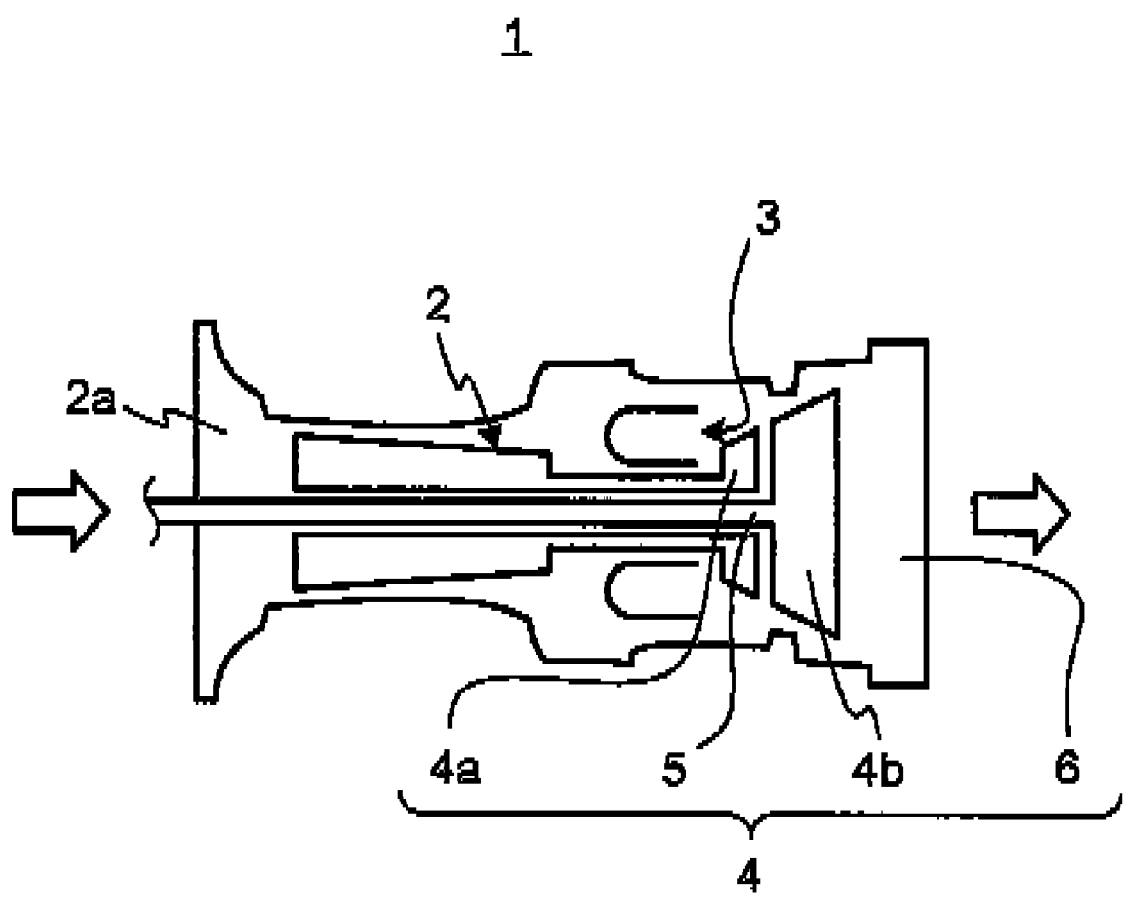
FIG. 1 is a schematic sectional view of a turbo shaft engine according to a first embodiment of the present invention.

EXPLANATIONS OF LETTERS OR NUMERALS 1, 201, 301, 401 turbo shaft engine (gas turbine)
2 compressor
3 combustor
4 turbine
5 turbine rotor (rotation shaft)
6 exhaust hood
7 diffuser (casing)
7a outer diffuser
7b inner diffuser
8 bearing unit
10a combustion gas passageway
10b exhaust gas passageway
11 bearing
12 bearing case
13, 213, 313, 413 bearing frame (reaction-force decreasing unit)
14a rotation axis
16 stationary blade
17 moving blade
18 lubricant supply tube
19, 20, 23, 219, 220, 223, 319 diaphragm
21, 22, 221, 222, 321 connecting unit
424 beam portion
425 slit
428 shield

BEST MODE(S) FOR CARRYING OUT THE INVENTION

Figure 2:
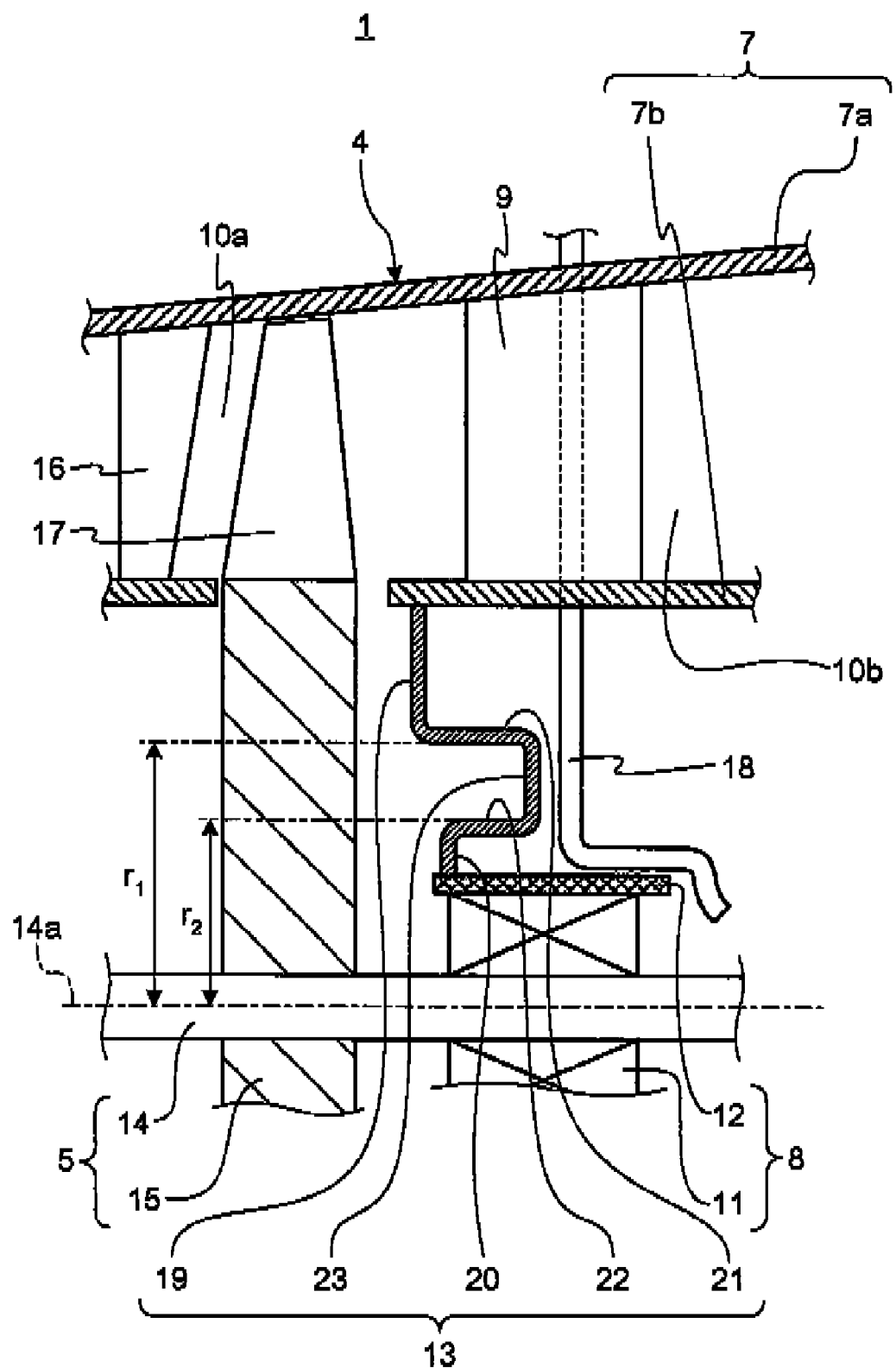
FIG. 2 is a partial sectional view of a bearing frame of the turbo shaft engine according to the first embodiment of the present invention.

Bearing support structures and gas turbines according to embodiments of the present invention are hereinafter explained in detail with reference to the drawings. These embodiments are not intended to limit the present invention. Constituent elements in the embodiments include those that are easily replaceable by a person skilled in the art, and those substantially the same.
First Embodiment FIG. 1 is a schematic sectional view of a turbo shaft engine as a gas turbine according to a first embodiment of the present invention, and FIG. 2 is a partial sectional view of a bearing frame as a reaction-force decreasing unit of the turbo shaft engine according to the first embodiment. In the first embodiment, the bearing support structure according to the present invention applied to a turbo shaft engine 1 as the gas turbine is explained. The turbo shaft engine 1 shown in FIGS. 1 and 2 is, for example, used as an engine of a helicopter.

The turbo shaft engine 1 includes, as shown in FIG. 1, a compressor 2, a combustor 3, and a turbine 4, and an output shaft (not shown) is connected to the turbine 4. The compressor 2 includes an air intake 2a for taking in the air, and a plurality of stationary blades and moving blades is alternately arranged in a compressor cylinder. The combustor 3 can cause combustion by a fuel supplied to the air compressed by the compressor 2 and ignited by a burner. The turbine 4 includes a compressor turbine 4a and a power turbine 4b positioned downstream of the compressor turbine 4a. The plural stationary blades 16 (see FIG. 2) and the plural moving blades 17 (see FIG. 2) are alternately arranged in the turbine cylinder, and the turbine 4 includes an exhaust hood 6 positioned downstream of a turbine rotor 5 and the power turbine 4b. A bearing frame 13 as the reaction-force decreasing unit described later is positioned between the power turbine 4b and the exhaust hood 6. The turbine rotor 5 is positioned to go through the center of the compressor 2, the combustor 3, and the turbine 4. One end thereof on the exhaust hood 6 side is rotatably supported by a bearing unit 8 on the exhaust hood side (see FIG. 2), and the other end thereof on the compressor 2 side is rotatably supported by a bearing unit on the compressor side (not shown). The moving blades 17 of the turbine 4 is connected to the turbine rotor 5, and an output shaft (not shown) is connected to the compressor 2 side.

Accordingly, because the air taken from the air intake 2a of the compressor 2 passes through the stationary blades and the moving blades and is compressed, the air becomes high-temperature and high-pressure compressed air. A predetermined fuel is supplied to the compressed air by the combustor 3 to cause combustion. A high-temperature and high-pressure combustion gas, which is a working fluid generated by the combustor 3, passes through the stationary blades and the moving blades constituting the turbine 4 to thereby rotatingly drive the turbine rotor 5 and drive the output shaft connected to the turbine rotor 5. On the other hand, the exhaust gas passes through a diffuser 7 (see FIG. 2) of the exhaust hood 6 to be converted to have a static pressure, and is discharged backward.

Specifically, as shown in FIG. 2, the turbine 4 includes an outer diffuser 7a and an inner diffuser 7b, which constitute the diffuser 7 (corresponding to the casing of the bearing support structure), the bearing unit 8 (corresponding to the bearing unit of the bearing support structure) as a bearing unit housed in the inner diffuser 7b, and the turbine rotor 5 (corresponding to a rotation shaft of the bearing support structure) rotatably supported by the bearing unit 8.

The outer diffuser 7a and the inner diffuser 7b are respectively formed in a cylindrical shape, and connected by a strut 9 so that central axes of the cylindrical shapes substantially agree with each other, and an annular combustion gas passageway 10a and an exhaust gas passageway 10b are formed therebetween. The combustion gas passageway 10a is positioned on an upstream side of the exhaust gas passageway 10b, and the stationary blades 16 are fixed in the combustion gas passageway 10a with equal intervals in the circumferential direction. The combustion gas passageway 10a and the exhaust gas passageway 10b communicate with each other, interposing therebetween the stationary blades 16 and the moving blades 17 positioned downstream of each stationary blade 16. The combustion gas passageway 10a introduces the combustion gas to the stationary blades 16 and the moving blades 17, and the exhaust gas passageway 10b exhausts the combustion gas having passed through the moving blades 17 as the exhaust gas.

The bearing unit 8 includes a bearing 11 and a bearing case 12 that houses the bearing 11. The bearing case 12 is formed in a cylindrical shape, and is connected to the inner diffuser 7b by the bearing frame 13 as the reaction-force decreasing unit (corresponding to the reaction-force decreasing unit of the bearing support structure) on an outer circumference thereof. The bearing case 12 holds the bearing 11 on an inner circumference thereof, that is, in a hollow part, and the bearing 11 rotatably supports the turbine rotor 5 in the inner diffuser 7b.

The turbine rotor 5 includes a shaft 14 rotatable around a rotation axis 14a and formed in a cylindrical shape, and a disk 15 fixed to the shaft 14. The disk 15 is formed in a disk-like shape, and the moving blades 17 described above are fixed on the outer circumference of the disk 15 with equal intervals in the circumferential direction. The moving blades 17 are positioned on the downstream side of the stationary blades 16, to face the stationary blades 16 in the flow direction of the combustion gas.

The turbine 4 includes a lubricant supply tube 18 that supplies a lubricant to the bearing unit 8. The lubricant supply tube 18 is extended up to near the bearing unit 8 from outside of the outer diffuser 7a through the inside of the strut 9. The lubricant supply tube 18 supplies the lubricant to the bearing unit 8, and the bearing unit 8 is lubricated and cooled by the lubricant.

In the turbine 4 constructed in this manner, for example, when the turbine rotor 5 abnormally rotates to cause a fracture of the moving blade 17 and thus the turbine rotor 5 becomes unbalanced, the turbine rotor 5 largely vibrates, and the vibration thereof are transmitted to the bearing unit 8 and the diffuser 7. The structure such as the bearing unit 8, the diffuser 7, and the lubricant supply tube 18 may be damaged or broken due to the vibration of the diffuser 7 itself.

In the turbo shaft engine 1 according to the first embodiment, therefore, the bearing frame 13 connecting the inner diffuser 7b and the bearing case 12 is formed with a low rigidity in the radial direction so that the radial reaction force on the bearing unit 8 side is reduced. Accordingly, even if the turbine rotor 5 becomes unbalanced and large vibration occurs in the turbine rotor 5, a damage of the device due to the vibration is suppressed. The radial reaction force on the bearing unit 8 side is a reaction force with respect to a direction orthogonal to the rotation axis 14a. The rigidity in the radial direction is the one with respect to the direction orthogonal to the rotation axis 14a.

That is, the bearing frame 13 that supports the bearing unit 8 is formed with the rigidity in the radial direction being reduced, to thereby form a flexible structure. Accordingly, the bearing frame 13 elastically deforms in the radial direction so that the bearing unit 8 can be displaced relative to the inner diffuser 7b. For example, the reaction force as an unbalanced force (vibration due to misalignment of the rotation axis or the like) of the turbine rotor 5 is distributed, different from a case of the bearing frame 13 being formed in the rigid structure, and by decreasing the reaction force by the bearing frame 13, the reaction force transmitted to the entire device can be decreased.

Specifically, as shown in FIG. 2, the bearing frame 13 is formed in an annular shape around the bearing unit 8 as a whole. The bearing frame 13 includes a first diaphragm 19, a second diaphragm 20, and a third diaphragm 23, which are made of metals, as three diaphragms, and a first connecting unit 21 and a second connecting unit 22, which are made of metals, connecting these diaphragms. A proximal end of the first diaphragm 19 is connected to an inner circumference of the inner diffuser 7b, a proximal end of the second diaphragm 20 is connected to the outer circumference of the bearing case 12, and the third diaphragm 23 is provided on an opposite side of the first diaphragm 19 with respect to the second diaphragm 20. The first connecting unit 21 connects a distal end of the first diaphragm 19 and one end of the third diaphragm 23, and the second connecting unit 22 connects the other end of the third diaphragm 23 and a distal end of the second diaphragm 20.

The first, second, and third diaphragms 19, 20, and 23 are formed in a disk-like shape perpendicular to the rotation axis 14a. The second diaphragm 20 is formed such that an outer diameter r2 thereof is smaller than an inner diameter r1 of the first diaphragm 19, and the third diaphragm 23 is formed such that an inner diameter thereof is equal to the outer diameter r2 of the second diaphragm 20 and that an outer diameter thereof is equal to the inner diameter r1 of the first diaphragm 19. The first and second connecting units 21 and 22 are formed in a cylindrical shape such that the central axes thereof are parallel to the rotation axis 14a. The first, second, and third diaphragms 19, 20, and 23 have a low rigidity, that is, have a weak spring force and is flexible. On the other hand, the first and second connecting units 21 and 22 have a higher rigidity than that of the first and second diaphragms 19 and 20. Accordingly, the bearing frame 13 has a high rigidity and strength in the circumferential direction as a whole, and can ensure high a torsional rigidity and strength in the circumferential direction in a connecting portion between the inner diffuser 7b and the bearing case 12. The rigidity in the radial direction of the entire bearing frame 13 can be adjusted by respectively adjusting the rigidities of the first, second, and third diaphragms 19, 20 and 23, an interval between the first and third diaphragms 19 and 23, that is, an axial length of the first connecting unit 21, and an interval between the second and third diaphragms 20 and 23, that is, an axial length of the second connecting unit 22. That is, the rigidities of the first, second, and third diaphragms 19, 20, and 23 are decreased, and the axial lengths of the first and second connecting units 21 and 22 are increased to thereby reduce the spring constant with respect to the radial direction of the entire bearing frame 13 and reduce the rigidity.

In the turbo shaft engine 1 constructed in this manner, the turbine rotor 5 is well balanced as a rotor in a state of all the moving blades 17 being present. For example, if the turbine rotor 5 abnormally rotates to cause a fracture of the moving blade 17, the turbine rotor 5 becomes unbalanced as the rotor, and the rotation axis 14a may be misaligned and largely vibrate radially. At this time, when the vibration is added radially to the first, second, and third diaphragms 19, 20, and 23 via the bearing unit 8, because the first, second, and third diaphragms 19, 20, and 23 are respectively formed flexibly with a weak spring force, even if the rotation axis 14a of the turbine rotor 5 is misaligned and largely vibrated in the radial direction and the bearing unit 8 is largely vibrated in the radial direction, the first, second, and third diaphragms 19, 20, and 23 are greatly bent and curved out of plane, that is, in a direction of the rotation axis 14a to decrease the reaction force. That is, the vibration of the turbine rotor 5 is buffered and the reaction force transmitted to the entire device is decreased by making the bearing unit 8 easily displaceable relatively to the inner diffuser 7b by the bearing frame 13.

With the turbo shaft engine 1 according to the first embodiment, the fuel is supplied by the combustor 3 to the compressed air compressed by the compressor 2 to cause combustion, and the generated combustion gas is supplied to the turbine 4 to obtain the rotative power. The turbine 4 includes the outer diffuser 7a formed in the cylindrical shape, the inner diffuser 7b formed in the cylindrical shape and provided inside of the outer diffuser 7a, the bearing unit 8 formed in the cylindrical shape and housed in the inner diffuser 7b, and the moving blades 17 positioned on the downstream side of the stationary blades 16 in the flow direction of the combustion gas. The turbine 4 also includes the turbine rotor 5 rotatably supported by the bearing unit 8, the exhaust gas passageway 10b formed between the outer diffuser 7a and the inner diffuser 7b and capable of exhausting the combustion gas having passed though the moving blades 17 as the exhaust gas, and the bearing frame 13 that connects the inner diffuser 7b to the bearing unit 8 and can decrease the radial reaction force on the bearing unit 8 side.

Accordingly, the fuel is supplied by the combustor 3 to the compressed air compressed by the compressor 2 to cause combustion, the generated combustion gas is supplied to the turbine, the combustion gas having passed through the stationary blades 16 collides with the moving blades 17 to rotate the turbine rotor 5 provided with the moving blades 17, to thereby obtain the rotative power. The combustion gas having passed through the moving blades 17 is exhausted to the outside of the structure as the exhaust gas via the exhaust gas passageway 10b formed by the outer diffuser 7a and the inner diffuser 7b. In this period, because the bearing unit 8 rotatably supporting the turbine rotor 5 is connected to the inner diffuser 7b via the bearing frame 13, for example, even when the turbine rotor 5 abnormally rotates to cause a fracture of the moving blades 17 to make the turbine rotor 5 unbalanced and generate large vibration, the radial reaction force on the bearing unit 8 side is decreased by the bearing frame 13, to thereby suppress a damage of the device due to the vibration of the turbine rotor 5.

In the turbo shaft engine 1 according to the first embodiment, the bearing frame 13 is formed in the annular shape around the bearing unit 8, and has higher rigidity and strength in the circumferential direction than in the radial direction. Accordingly, by the bearing frame 13 formed in the annular shape around the bearing unit 8 and having higher rigidity and strength in the circumferential direction than in the radial direction, high torsional rigidity and strength with respect to the circumferential direction can be ensured at the connecting portion between the inner diffuser 7b and the bearing case 12. As a result, for example, even when the bearing 11 is stuck, and the turbine rotor 5 tries to rotate together with the bearing case 12, the bearing frame 13 can resist the torsional force via the bearing case 12.

In the turbo shaft engine 1 according to the first embodiment, the bearing frame 13 includes the first, second, and third diaphragms 19, 20, and 23 as the diaphragms formed in the disk-like shape perpendicular to the rotation axis 14a of the turbine rotor 5. Accordingly, because the first, second, and third diaphragms 19, 20, and 23 formed in the disk-like shape perpendicular to the rotation axis 14a are curved out of plane and deformed, the radial reaction force on the bearing unit 8 side can be efficiently decreased.

In the turbo shaft engine 1 according to the first embodiment, the bearing frame 13 includes the first connecting unit 21 that connects one ends of the adjacent first and third diaphragms 19 and 23 with each other, and the second connecting unit 22 that connects one ends of the third and second diaphragms 23 and 20 with each other, the first an second connecting units 21 and 22 being formed in the cylindrical shapes having the central axes parallel with the rotation axis 14a. Accordingly, because the first and third diaphragms 19 and 23 are connected by the first connecting unit 21 in parallel with a gap therebetween, and the third and second diaphragm 23 and 20 are connected by the second connecting unit 22 in parallel with a gap therebetween, the rigidity with respect to the radial direction of the entire bearing frame 13 is not increased, thereby enabling to effectively decrease the radial reaction force on the bearing unit 8 side, while ensuring the rigidity and strength in the circumferential direction.

Second Embodiment

Figure 3:
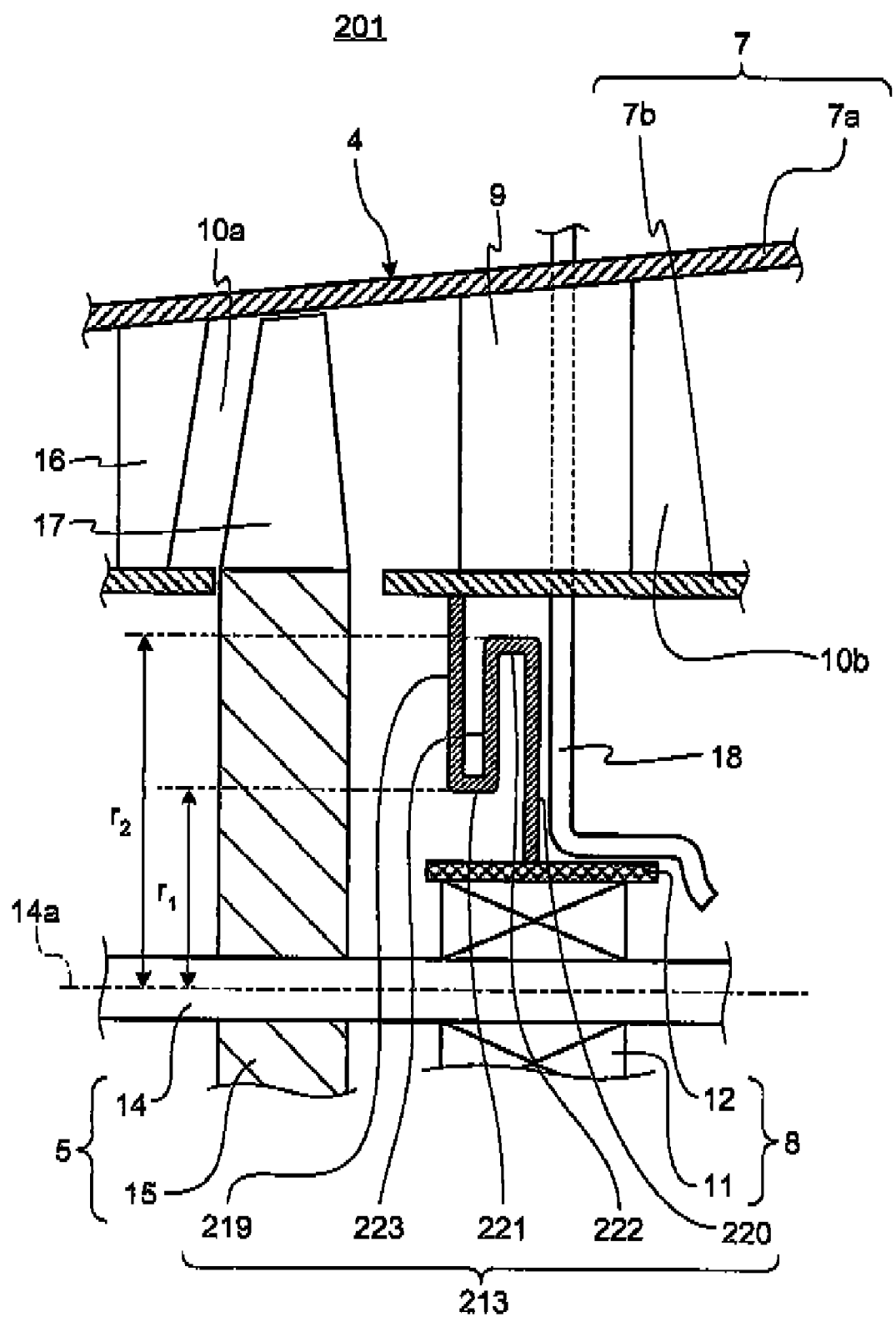
FIG. 3 is a partial sectional view of a bearing frame of the turbo shaft engine according to the second embodiment of the present invention.

FIG. 3 is a partial sectional view of a bearing frame of a turbo shaft engine according to a second embodiment of the present invention. A turbo shaft engine 201 according to the second embodiment has substantially the same configuration as that of the turbo shaft engine 1 according to the first embodiment, but is different from the turbo shaft engine 1 according to the first embodiment in that a diaphragm having a larger diameter ratio than that of the diaphragm in the first embodiment is used in a bearing frame 213 as the reaction-force decreasing unit. Duplicate explanations of the configuration, operation, and effect common to the first embodiment are omitted as much as possible, and like reference numerals refer to like parts.

The bearing frame 213 of the turbo shaft engine 201 includes three diaphragms, that is, first, second, and third diaphragms 219, 220, and 223, and these are connected with each other by first and second connecting units 221 and 222. The first, second, and third diaphragms 219, 220, and 223 are formed in the disk-like shape perpendicular to the rotation axis 14a, and have a low rigidity and weak spring force. On the other hand, the first and second connecting units 221 and 222 are formed in the cylindrical shape with the central axes thereof being parallel to the rotation axis 14a, and have a high rigidity.

A proximal end of the first diaphragm 219 is fixed to the inner circumference of the inner diffuser 7b, a proximal end of the second diaphragm 220 is fixed to the outer circumference of the bearing case 12 and an outer diameter r2 thereof is set longer than an inner diameter r1 of the first diaphragm 219. The third diaphragm 223 is positioned between the first diaphragm 219 and the second diaphragm 220. One end (one end on the bearing case 12 side in FIG. 3) of the third diaphragm 223 is connected to a distal end of the first diaphragm 219 via the first connecting unit 221, and the other end (one end on the inner diffuser 7b side in FIG. 3) thereof is connected to a distal end of the second diaphragm 220 via the second connecting unit 222. That is, the bearing frame 213 is formed so that the first, second, and third diaphragms 219, 220, and 223 are formed in layers in the axial direction (in the direction of the rotation axis 14a). That is, the first, second, and third diaphragms 219, 220, and 223 are respectively set so that the diameter ratios (outer diameter/inner diameter) thereof are larger than those of the first, second, and third diaphragms 19, 20, and 23 in the first embodiment. Because the radial length of the annular part becomes long, the rotational displacement of the first, second, and third diaphragms 219, 220, and 223 can be increased. Accordingly, the spring constant with respect to the radial direction of the entire bearing frame 13 is decreased and the rigidity decreases, while the gap between the first diaphragm 219 and the third diaphragm 223 and the gap between the third diaphragm 223 and the second diaphragm 220, that is, the axial lengths of the first and second connecting units 221 and 222 are shortened.

In the turbo shaft engine 201 according to the second embodiment, the bearing frame 213 includes the first diaphragm 219 having the proximal end fixed to the inner diffuser 7b, the second diaphragm 220 having the proximal end fixed to the bearing case 12 and the outer diameter longer than the inner diameter of the first diaphragm 219, and the third diaphragm 223 positioned between the first and second diaphragms 219 and 220, with one end thereof being connected to the distal end of the first diaphragm 219 via the first connecting unit 221 and the other end being connected to the distal end of the second diaphragm 220 via the second connecting unit 222.

Accordingly, the inner diffuser 7b and the bearing case 12 are connected with each other via the first, second, and third diaphragms 219, 220, and 223, and the outer diameter r2 of the second diaphragm 220 is longer than the inner diameter r1 of the first diaphragm 219. Because the first, second, and third diaphragms 219, 220, and 223 are provided in layers in the axial direction, and the distal end of the first diaphragm 219 is connected to one end of the third diaphragm 223 by the first connecting unit 221, and the distal end of the second diaphragm 220 is connected to the other end of the third diaphragm 223 by the second connecting unit 222, the flexible parts in the entire bearing frame 213 can be increased, and the rigidity of the bearing frame 213 decreases and the spring constant is decreased. Accordingly, even when the connecting units in the axial direction, that is, the lengths of the first and second connecting units 221 and 222 are reduced, the radial reaction force on the bearing unit 8 side can be sufficiently decreased. Because the lengths of the connecting units in the axial direction of the turbine rotor 5 can be reduced, the bearing support structure can be applied even when the axial space at the position for installing the bearing frame 213 is narrow. Further, because the first, second, and third diaphragms 219, 220, and 223 are arranged so that parts thereof are overlapped with each other in the axial direction, the radial length of the bearing frame 213 can be also reduced, thereby enabling to apply the bearing support structure even when the radial space at the position for installing the bearing frame 213 is narrow.

Third Embodiment

Figure 4:
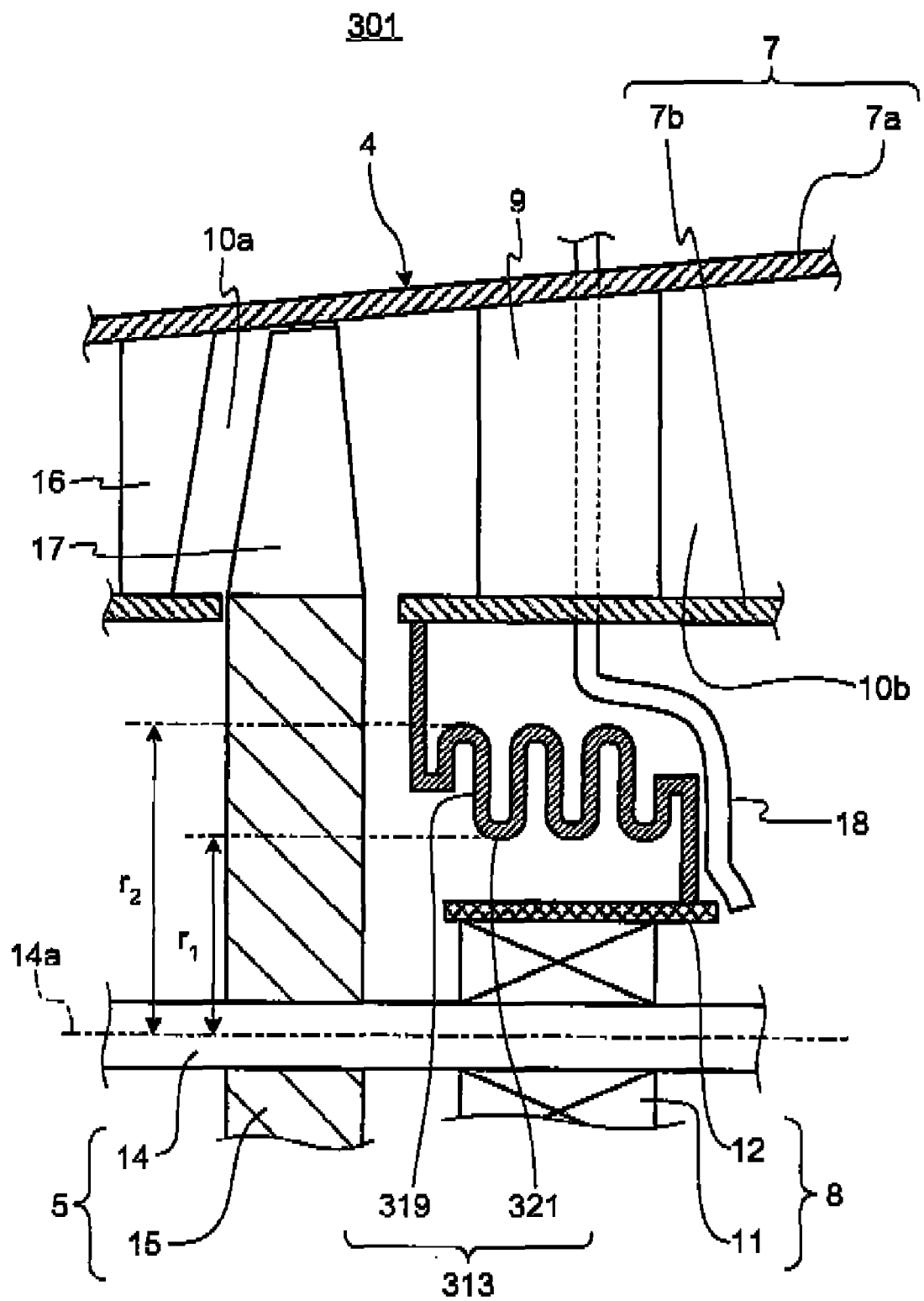
FIG. 4 is a partial sectional view of a bearing frame of the turbo shaft engine according to the third embodiment of the present invention.

FIG. 4 is a partial sectional view of a bearing frame of a turbo shaft engine according to a third embodiment of the present invention. A turbo shaft engine 301 according to the third embodiment has substantially the same configuration as that of the turbo shaft engine 201 according to the second embodiment, but is different from the turbo shaft engine 201 according to the second embodiment in that a bearing frame 313 as the reaction-force decreasing unit has a bellows structure. Duplicate explanations of the configuration, operation, and effect common to the second embodiment are omitted as much as possible, and like reference numerals refer to like parts.

The bearing frame 313 of the turbo shaft engine 301 has a plurality of diaphragms 319 formed in a disk-like shape perpendicular to the rotation axis 14a, and having a low rigidity and weak spring force. These diaphragms 319 adjacent to each other are respectively connected with each other via the connecting units 321, to form a bellows structure in the axial direction. The diaphragms 319 respectively have an inner diameter r1 and an outer diameter r2 substantially equal to each other. Because the diameter ratio of the respective diaphragms 319 is smaller and the radial length of the toroidal part is shorter than those of the first, second, and third diaphragms 219, 220, and 223 in the second embodiment, the rigidity thereof is not lower than the rigidity in the second embodiment. However, the rigidity of the entire bearing frame 313 is set lower than that of the bearing frame 213 of the turbo shaft engine 201 according to the second embodiment by increasing the number of diaphragms 319.

In the turbo shaft engine 301 according to the third embodiment, the bearing frame 313 has the bellows structure. Accordingly, because the many diaphragms 319 formed in the disk-like shape perpendicular to the rotation axis 14a are curved out of plane and deformed, the radial reaction force on the bearing unit 8 side can be decreased, and because the bearing frame 313 itself expands and contracts in the axial direction, the axial reaction force can be also decreased efficiently. Also in other embodiments described above, because the bearing frame itself can expand and contract slightly in the axial direction, the axial reaction force can be decreased.

Fourth Embodiment

Figure 5:
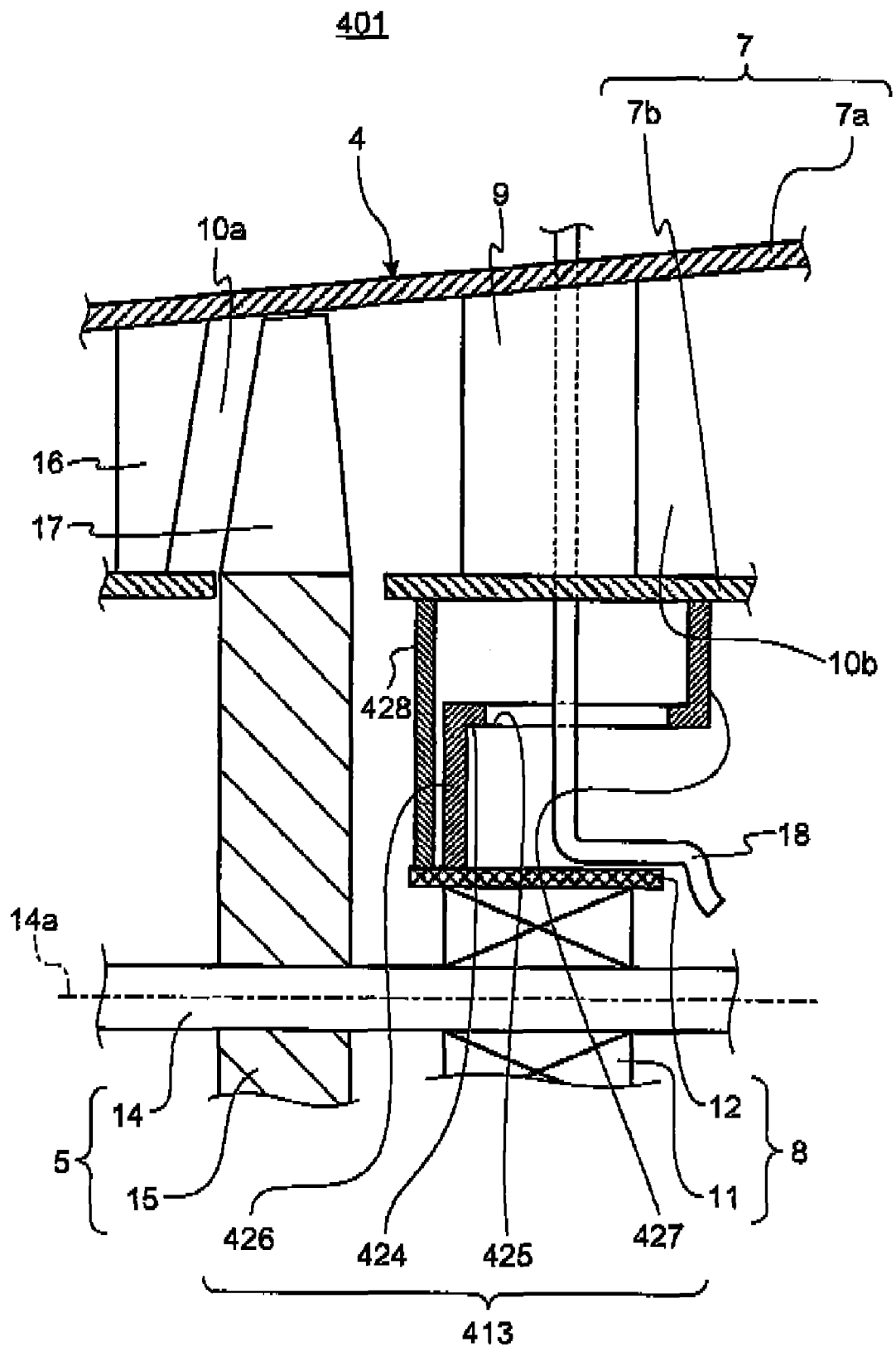
FIG. 5 is a partial sectional view of a bearing frame of the turbo shaft engine according to the forth embodiment of the present invention.
Figure 6:
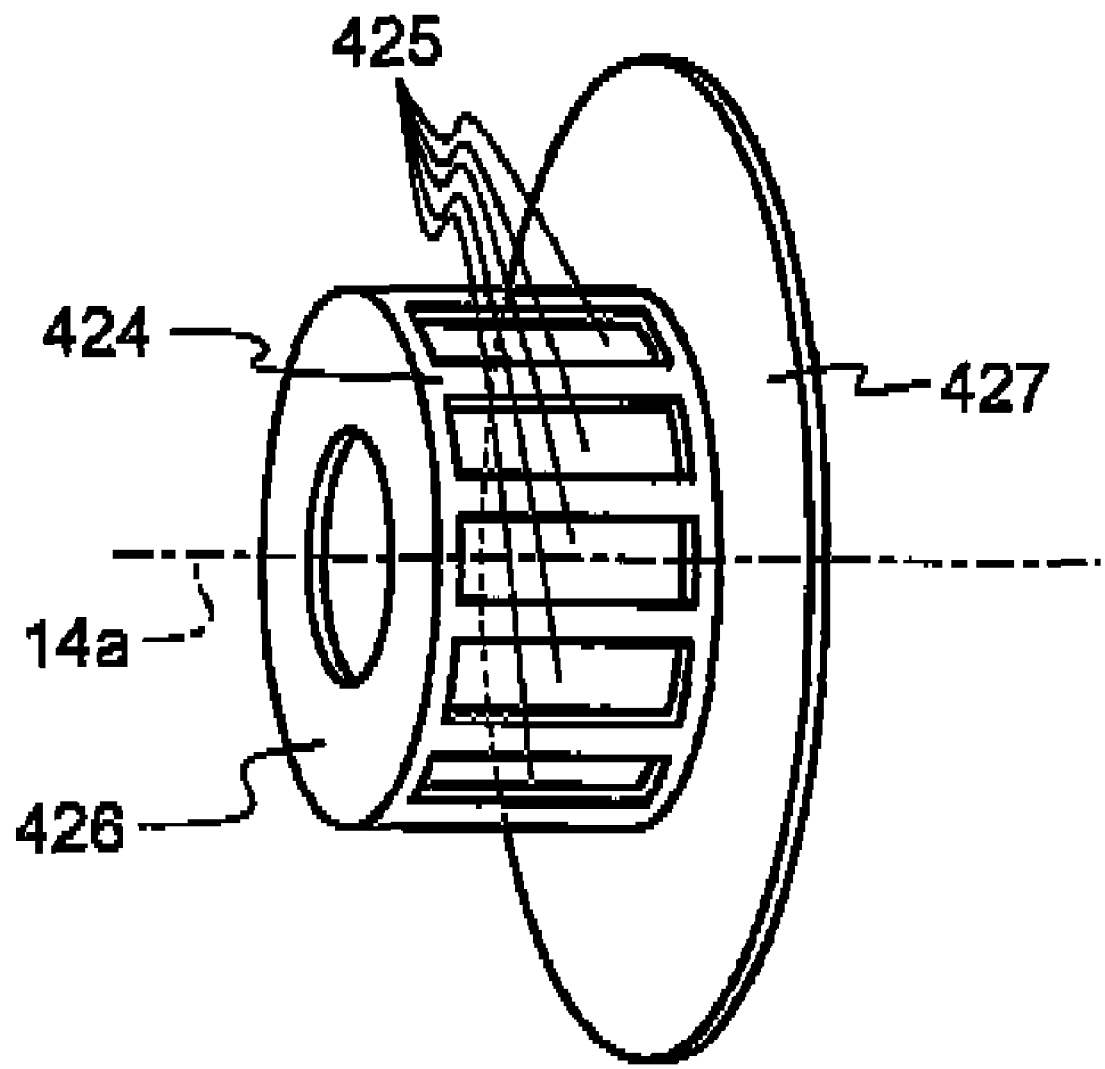
FIG. 6 is a schematic sectional view of a bearing frame of the turbo shaft engine according to the forth embodiment of the present invention.

FIG. 5 is a partial sectional view of a bearing frame of a turbo shaft engine according to a fourth embodiment of the present invention, and FIG. 6 is a schematic perspective view of the bearing frame of the turbo shaft engine according to the fourth embodiment. A turbo shaft engine 401 according to the fourth embodiment has substantially the same configuration as that of the turbo shaft engine 1 according to the first embodiment, but is different from the turbo shaft engine 1 according to the first embodiment in that a bearing frame 413 as the reaction-force decreasing unit does not include the diaphragm. Duplicate explanations of the configuration, operation, and effect common to the first embodiment are omitted as much as possible, and like reference numerals refer to like parts.

The bearing frame 413 of the turbo shaft engine 401 includes a beam portion 424 formed in a cylindrical shape having a central axis parallel with the rotation axis 14a, a bearing-unit-side fixed portion 426 to be fixed to the bearing case 12, and a diffuser-side fixed portion 427 to be fixed to the inner diffuser 7b. The bearing-unit-side fixed portion 426 and the diffuser-side fixed portion 427 are formed to have high rigidities by using a metal.

The bearing-unit-side fixed portion 426 is formed in a disk-like shape perpendicular to the rotation axis 14a, and the proximal end thereof is fixed to the outer circumference of the bearing case 12. On the other hand, the diffuser-side fixed portion 427 is formed in a disk-like shape perpendicular to the rotation axis 14a, and the proximal end thereof is fixed to the inner circumference of the inner diffuser 7b. The beam portion 424 connects a distal end of the bearing-unit-side fixed portion 426 and a distal end of the diffuser-side fixed portion 427 with each other. As shown in FIG. 6, a plurality of slits 425 is formed on the beam portion 424 in the direction of the rotation axis 14a. That is, the beam portion 424 has a shape like a plurality of beams parallel with the rotation axis 14a, and the rigidity with respect to the radial direction can be decreased. Accordingly, when the radial reaction force is applied to the bearing frame 413, the beam portion 424 is displaced in the radial direction, to thereby decrease the reaction force. The lubricant supply tube 18 can also supply the lubricant to the bearing unit 8, passing through any one of the slits 425.

In the turbo shaft engine 401 according to the fourth embodiment, because the slits 425 are formed on the beam portion 424, a disk-like shield 428 is provided on an upstream side of the bearing-unit-side fixed portion 426 in the flow direction of the combustion gas. The shield 428 is fixed so that a gap between the outer circumference of the bearing case 12 and the inner circumference of the inner diffuser 7b is closed to prevent a backflow of the gas to a low pressure part on the exhaust side in the inner diffuser 7b. Because the shield 428 does not support the bearing unit 8, a high rigidity is not required, and because a material following a radial deformation of the bearing frame 413 is used, the shield 428 does not interfere with a decrease of the reaction force.

In the turbo shaft engine 401 according to the fourth embodiment, the turbo shaft engine 401 includes the bearing frame 413 and the beam portion 424 that is formed in the cylindrical shape having a central axis parallel with the rotation axis 14a and provided with a plurality of slits 425 formed thereon in the direction of the rotation axis 14a, where the lubricant supply tube 18 supplies the lubricant through the slits 425. Accordingly, the rigidity of the beam portion 424 formed in the cylindrical shape with the center axis parallel with the rotation axis 14a is decreased by the slits 425 formed in the direction of the rotation axis 14a to thereby have a flexible structure in the radial direction. Therefore, the radial reaction force on the bearing unit 8 side can be decreased by the bearing frame 413, and the lubricant supply tube 18 can be provided through the slits 425, through which the lubricant can be supplied to the bearing unit 8. As a result, a space for providing the lubricant supply tube 18 needs not be provided separately, and an interference between the bearing frame 413 and the lubricant supply tube 18 needs not be taken into consideration, thereby enabling to miniaturize the turbine 4.

The gas turbines and the bearing support structures according to the embodiments are not limited to those as described above, and can be variously modified within the spirit or scope as defined by the appended claims. In the above explanations, the gas turbine and the bearing support structure are applied to a turbo shaft engine of the helicopter, however, these can be used for a turbo jet engine, a turbo fan engine, a turbo-prop engine, or the like. The gas turbine can be used for an industrial gas turbine, not for the aeronautical gas turbine. In the above explanations, the casing of the bearing support structure of the present invention includes the outer diffuser 7a, the inner diffuser 7b, and the strut 9, and the bearing frames 13, 213, 313, and 413 as the reaction-force decreasing unit are connected to the inner diffuser 7b. However, the casing can be formed of a single cylindrical member, and the reaction-force decreasing unit can be connected to the member.

INDUSTRIAL APPLICABILITY

The bearing support structure and the gas turbine according to the present invention effectively decreases vibration of the rotation shaft by connecting the bearing unit rotatably supporting the rotation shaft and the casing so that the radial reaction force can be decreased, to suppress a damage of the device due to the vibration of the rotation shaft. Accordingly, the bearing support structure and the gas turbine according to the present invention can be applied to various devices having rotation shafts.

The invention claimed is:

1. A bearing support structure comprising:
a casing formed in a cylindrical shape;
a bearing unit formed in a cylindrical shape and housed in the casing;
a rotation shaft rotatably supported by the bearing unit; and
a reaction-force decreasing unit that connects the casing and the bearing unit, and is configured to decrease a radial reaction force on the bearing unit side.

2. The bearing support structure according to claim 1, wherein the reaction-force decreasing unit is formed in an annular shape around the bearing unit, and has a higher rigidity or strength in a circumferential direction than in a radial direction.

3. The bearing support structure according to claim 1, wherein the reaction-force decreasing unit has a plurality of diaphragms formed in a disk-like shape perpendicular to a rotation axis of the rotation shaft.

4. The bearing support structure according to claim 3, wherein the reaction-force decreasing unit includes a connecting unit that is formed in the cylindrical shape having a central axis parallel with the rotation axis, and that connects one ends of adjacent ones of the diaphragms with each other.

5. The bearing support structure according to claim 4, wherein the reaction-force decreasing unit includes: a first diaphragm having a proximal end fixed to the casing; a second diaphragm having a proximal end fixed to the bearing unit and an outer diameter longer than an inner diameter of the first diaphragm; and a third diaphragm positioned between the first diaphragm and the second diaphragm, with one end thereof being connected to a distal end of the first diaphragm via a first connecting unit and the other end being connected to a distal end of the second diaphragm via a second connecting unit.

6. The bearing support structure according to claim 1, wherein the reaction-force decreasing unit has a bellows structure.

7. The bearing support structure according to claim 1, wherein the reaction-force decreasing unit has a beam portion that is formed in a cylindrical shape having a central axis parallel with the rotation axis, and that is formed with a plurality of slits in a direction of the rotation axis.

8. A gas turbine in which fuel is supplied by a combustor to compressed air that is compressed by a compressor to cause combustion, and generated combustion gas is supplied to the turbine to obtain rotative power,
the turbine comprising:
an outer diffuser formed in a cylindrical shape;
an inner diffuser formed in a cylindrical shape and provided inside of the outer diffuser;
a bearing unit formed in a cylindrical shape and housed in the inner diffuser;
a turbine rotor having a moving blade positioned on a downstream side of a stationary blade in a flow direction of the combustion gas, and rotatably supported by the bearing unit;
an exhaust gas passageway formed between the outer diffuser and the inner diffuser, and capable of exhausting the combustion gas having passed through the moving blade as an exhaust gas; and
a reaction-force decreasing unit that connects the inner diffuser and the bearing unit, and decreases a radial reaction force on the bearing unit side.

* * * * *